United States Patent [19]
Holm et al.

[11] Patent Number: 5,850,629
[45] Date of Patent: Dec. 15, 1998

[54] USER INTERFACE CONTROLLER FOR TEXT-TO-SPEECH SYNTHESIZER

[75] Inventors: Frode Holm; Steve Pearson, both of Santa Barbara, Calif.

[73] Assignee: Matsushita Electric Industrial Co., Ltd.

[21] Appl. No.: 709,582

[22] Filed: Sep. 9, 1996

[51] Int. Cl.⁶ .................................................. G10L 5/02
[52] U.S. Cl. ........................................ 704/260; 704/270
[58] Field of Search .................................. 704/260, 270, 704/276, 272

[56] References Cited

U.S. PATENT DOCUMENTS

| | | |
|---|---|---|
| 5,111,409 | 5/1992 | Gasper et al. ........................... 704/260 |
| 5,475,796 | 12/1995 | Iwata ........................................ 704/260 |
| 5,500,919 | 3/1996 | Luther ...................................... 704/260 |
| 5,634,084 | 5/1997 | Malsheen et al. ....................... 704/260 |

*Primary Examiner*—Richemond Dorvil
*Attorney, Agent, or Firm*—Harness, Dickey & Pierce, P.L.C.

[57] ABSTRACT

An application-independent, text-to-speech control system which employs an easy-to-use transport from which a user can control most text-to-speech conversion functions without prior training. It provides a control means by which user designated areas may be sequentially selected, stored and played. Furthermore, moving back and forward through user-selected text may be controlled by the user, with the synthesized speech output maintaining the proper pauses and inflections.

14 Claims, 9 Drawing Sheets

USER INTERFACE CONTROLLER FOR TEXT-TO-SPEECH SYNTHESIZER

BACKGROUND AND SUMMARY OF THE INVENTION

The present invention relates generally to text-to-speech (TTS) synthesizers. More particularly, the invention relates to an improved system for enabling a user to interact with and control a TTS synthesizer.

Text-to-speech (TTS) conversion promises to simplify and enhance the accuracy of a number of everyday tasks in the work environment. However, until the TTS systems are made more intuitive and user friendly, the full potential of TTS will not be reached. To the extent text-to-speech features have been implemented in some computer software applications in the past, these represent the exception rather than the rule. Currently, TTS services are not available to all software applications—current TTS systems are not designed to work with any arbitrary application that contains data to be spoken. This shortcoming must be overcome before TTS technology will become truly useful. Even with those applications that currently support TTS, there is still a great deal of room for improvement.

Ideally, the synthesized speech should sound smooth and continuous, with appropriate pauses and inflections added to simulate natural speech. Current TTS systems fall far short of this mark, sounding more like a choppy concatenation of words, spoken without any sense for proper inflection. What the current technology lacks is the necessary a priori knowledge of prosodic context. For example, there is currently no user friendly mechanism for distinguishing between text read from typewritten prose, as contrasted with text read from tabular columns of a spreadsheet. Regarding TTS conversion of numbers, there is currently no easy-to-use mechanism for identifying the context in which the numbers should be read. In natural speech, part numbers are read differently than dollars and cents. The text-to-speech system should be able to do likewise.

Moving forward and backward through the text presents an even more challenging problem. While crude systems exist for moving forward and backwards through text, a word at a time, the user interface is unnatural and the synthesized speech lacks the prosodic nuances of spoken text. Ideally, the user, moving forward and backward in a block of text, would like the synthesized speech output to contain the appropriate inflection regardless of where the current speech segment is to begin. By analogy to a tape recorder, the spoken output should have the same pauses and inflections regardless of whether the text is played back from the beginning or from a random point in the middle. Current technology does not achieve this.

Text-to-speech conversion of material in charts and spreadsheets offers further challenge. Whereas with typewritten prose in paragraph form—that has a well-defined beginning, middle and end—text in charts and spreadsheets might be read in any random order. Current TTS systems have no easy-to-control system for handling this. There is no currently available way to read from one random location in a spreadsheet, jump to another location and read from that location. The ideal system would allow the user to define what segments are to be read and in what order.

Finally, little or no attention has been spent on management of user preferences. Text-to-speech conversion systems may require some degree of fine tuning by the user, to insure that the system will sound the way the user wishes it to. However, this is more easily said than done. Although sophisticated users with advanced degrees in speech technology may understand how to alter the phonetics used in the speech synthesizer, the average user will not. The ideal text-to-speech system should therefore include easy-to-use tools that will help the average user alter the way text is spoken by the system. The use of the tools should be self-evident and easy to employ. The system should also include facilities for management of user preferences, allowing changes made by the tools to be stored, recalled and modified. Current systems are deficient in this regard.

The present invention addresses the foregoing problems through an improved text-to-speech control system that employs an easy-to-use "transport bar" through which the user can control most text-to-speech conversion functions without a great deal of prior training. The control system is application independent. It will work with virtually every software application that supports a Windows-style clipboard facility. The preferred transport bar provides buttons resembling those found on a tape recorder, including Play, Stop, Fast-Forward, and Reverse. The preferred transport bar also includes a unique LED button used to load designated portions of text into a sequentially arranged set of buffers. The LED button allows the user to select discontiguous portions of text, such as randomly selected spreadsheet cells, for replay in a user defined sequence.

DETAILED DESCRIPTION OF THE PREFERRED EMBODIMENT

The text-to-speech (TTS) controller may be implemented on a range of different operating system platforms. For purposes of illustrating the invention, the specification here will describe the invention in a Windows operating system environment. More specifically, the invention is disclosed in a Windows 3.1 environment. Where applicable, modifications to implement the system on Windows '95 and Windows NT platforms are given. The Windows 3.1, Windows '95 and Windows NT operating systems are commercially available from Microsoft Corporation, Redmond, Wash. It will be understood that the invention is not limited to the Microsoft Windows environments; rather, the invention may be implemented in any suitable operating system environment that provides the requisite graphical user interface components and a suitable clipboard mechanism, or the like. Thus, the invention may also be implemented on UNIX operating systems, OS/2 (a product of IBM Corporation) and the Macintosh operating system (a product of Apple Computer Corporation).

Figure 1:
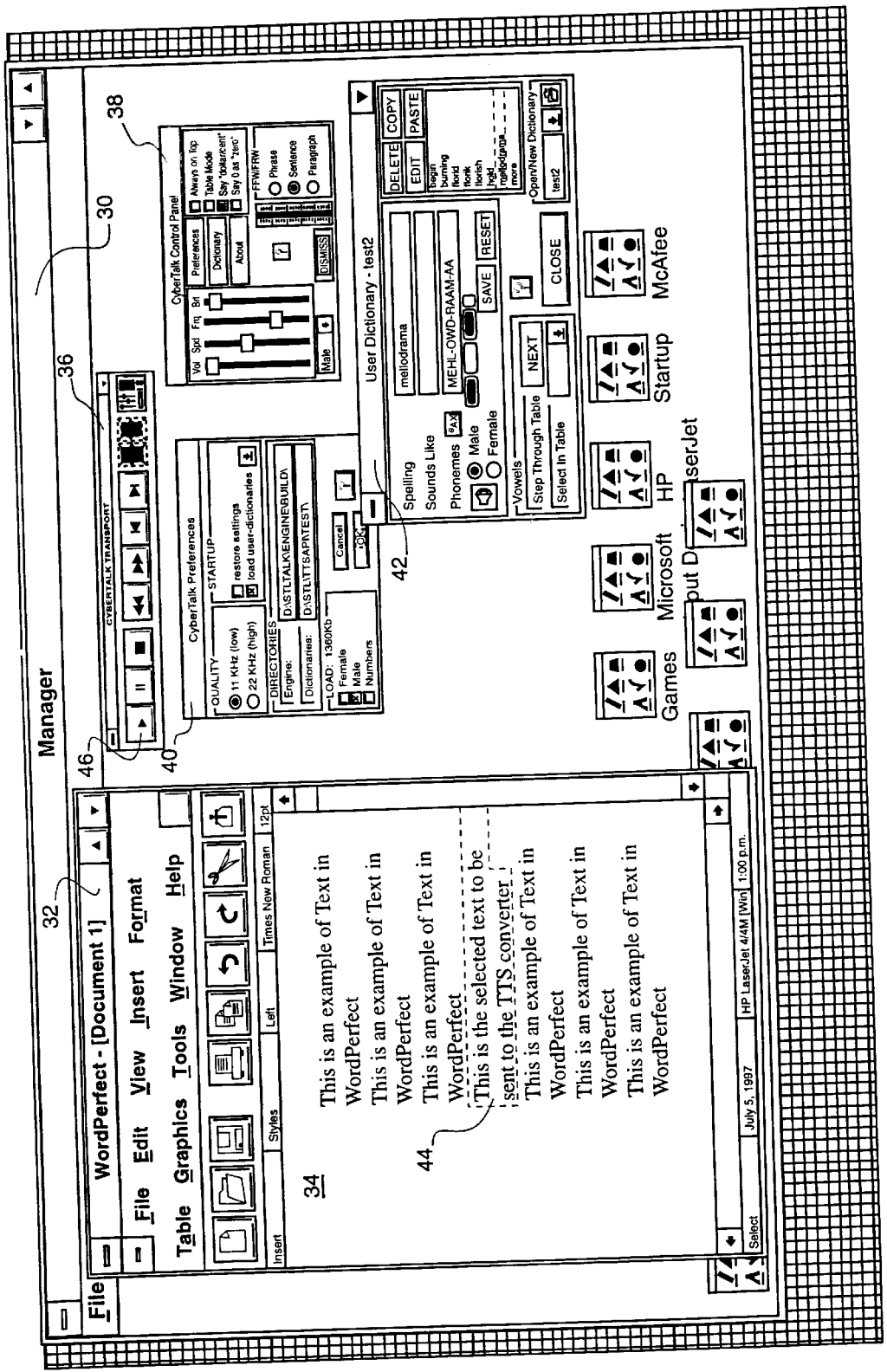
FIG. 1 is a screen display showing the principal graphical user interface panels of the preferred embodiment of the invention in conjunction with an example of a target application (a word processing application)

FIG. 1 depicts a Windows 30 environment containing a word processing target application 32 having an open text window 34, and four graphical user interface (GUI) panels of the preferred embodiment of the present invention. The four GUI panels of the preferred embodiment are: a transport bar 36, a control panel 38, a preferences panel 40, and a dictionary editor panel 42.

The basic operation of the preferred embodiment entails activation of the text-to-speech (TTS) conversion application. This initial activation produces the transport bar 36 in the Windows 30 display. After the initial activation, the user selects text in the open text window 34 which is to be converted to audible speech. The selection in this case is made by the user highlighting that portion of the text in the open text window 34 which is to be converted to speech. For example, the user may highlight selected text using the mouse or other pointing device. After the user selection, the conversion of the highlighted text 44 begins once the play button 46, contained on the transport bar 36, is activated by the user.

Figure 2:
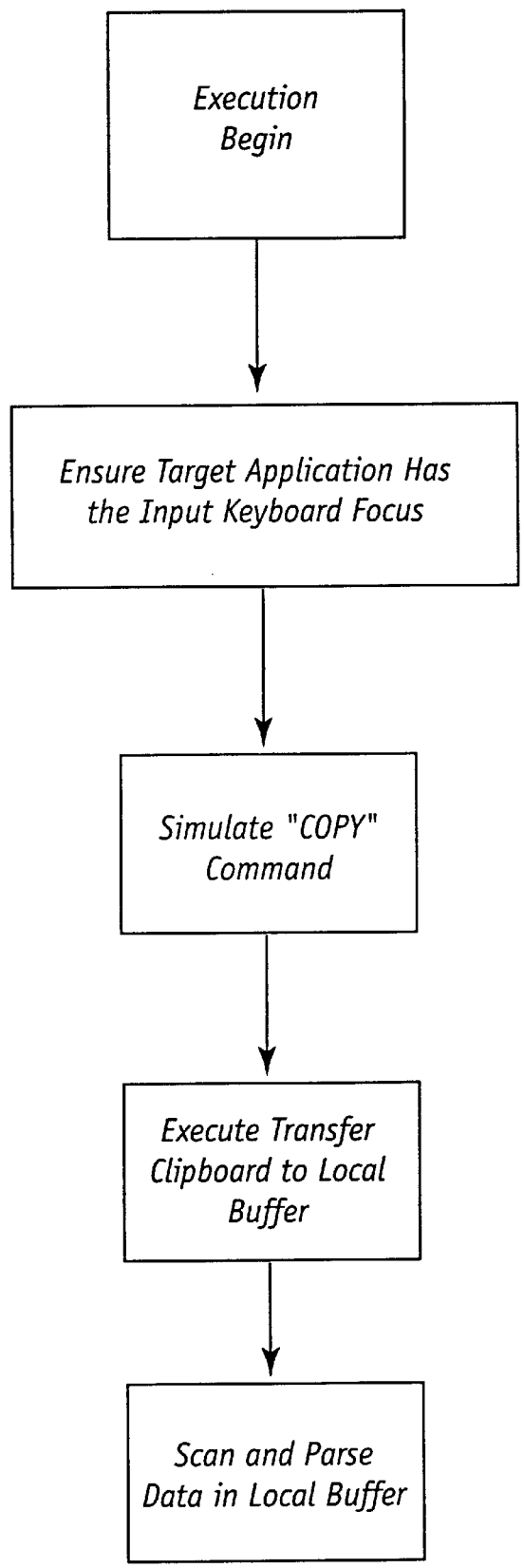
FIG. 2 is a flowchart illustrating the presently preferred extraction algorithm.

The first step in the conversion process is the extraction of the highlighted text 44 from the open text window 34 of the word processing target application 32. FIG. 2 presents the basic extraction algorithm.

The TTS conversion application begins by ensuring that the word processing target application 32 has the input keyboard focus. Once this condition has been satisfied, the TTS conversion application simulates the keystrokes required to activate a "copy" command in the word processing target application 32. Specifically, this is accomplished through a call to a Windows 30 kernel function (keyb_event), which subsequently provides information of keyboard activity to a system wide queue, from which the initiated copy command is routed to the word processing target application 32. The TTS conversion application causes the operating system to inject the keystrokes signifying a "copy" command (e.g. Ctrl-C) into the message queue.

Upon receipt of the simulated copy keystroke, the word processing target application 32 responds by placing the highlighted text 44 into the Windows clipboard, or other suitable reserved segment of memory used to hold data that has been copied from one text, data, or graphics document, in order to insert it into another. This is done through a read clipboard function call to Windows. Once the highlighted text 44 is available on the clipboard, the TTS conversion application then transfers the clipboard contents to a TTS text buffer for processing by the TTS conversion engine. The "copy" operations are performed automatically when the user highlights selected text and activates the play button 46.

Figure 3:
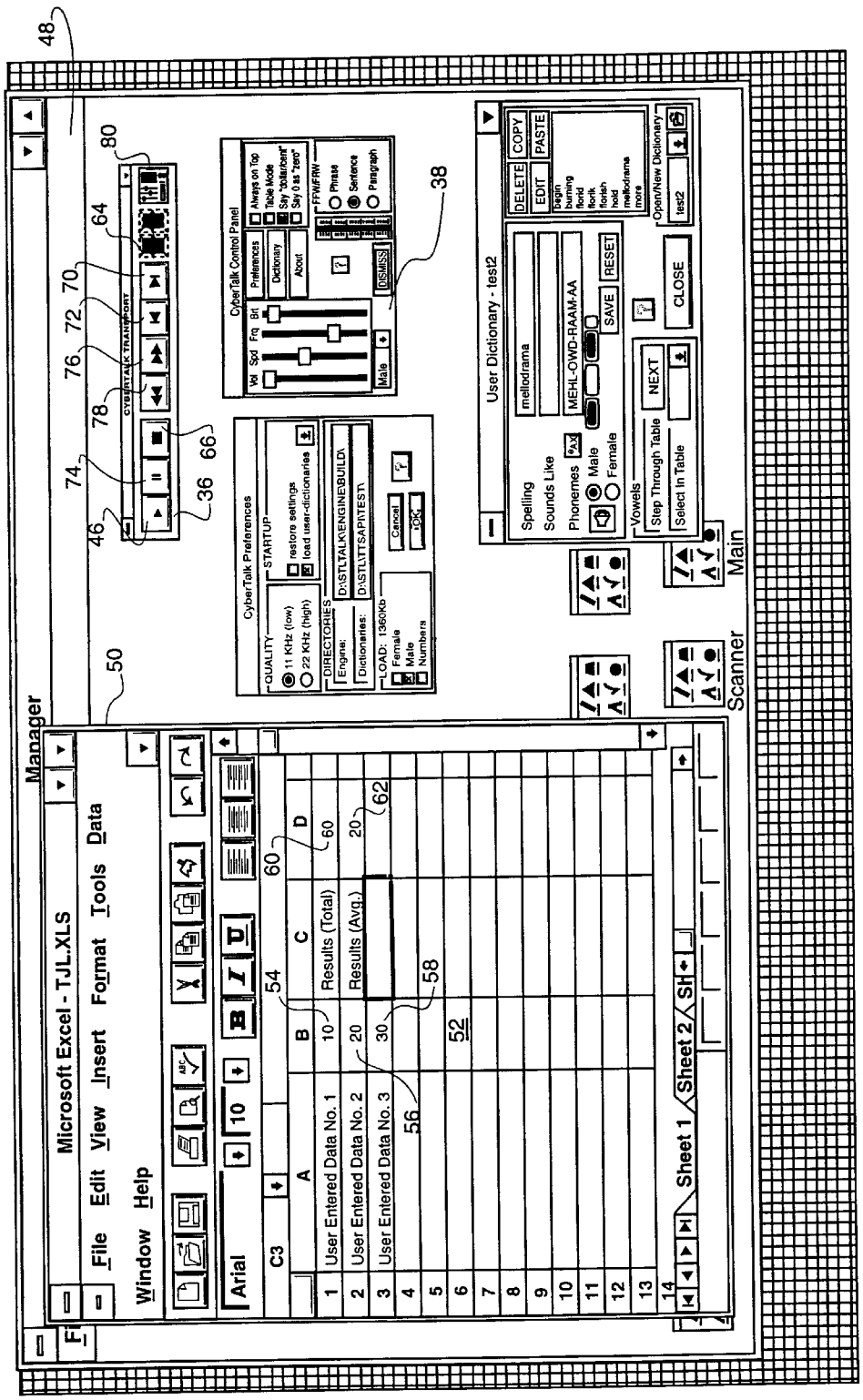
FIG. 3 is a display screen showing the transport bar of the invention in conjunction with a target application (a spreadsheet application), illustrating use of the LED button.
Figure 3A:
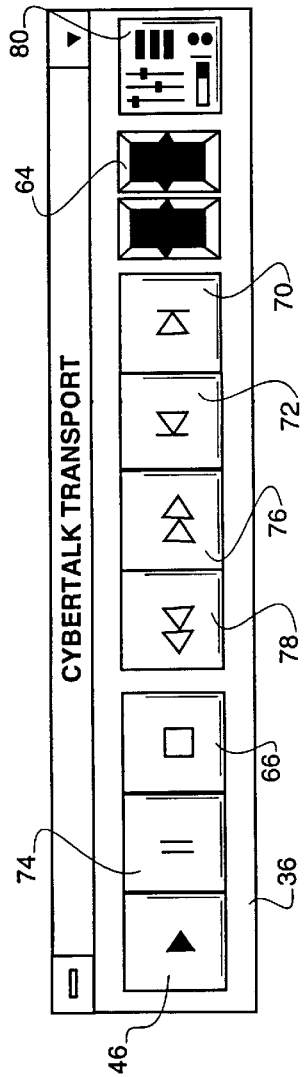
FIG. 3a is a detailed view of the transport bar as shown in FIG. 3.

The preferred embodiment also contains a capability by which discontiguous regions of text in a target application may be extracted and subsequently spoken in a single, continuous, TTS conversion. FIG. 3 presents a second Windows 48 environment containing a spreadsheet target application 50 having an open spreadsheet window 52 from which user TTS conversion is desired for discontiguous regions.

As shown in FIG. 3, spreadsheet applications generally contain user entered data (54, 56, 58), embedded equations (not visible in the open spreadsheet window 50), and spreadsheet results (60, 62) computed by applying the embedded equations to the entered data (54, 56, 58). For proofreading purposes, only the user entered data (54, 56, 58) is typically of interest. Because this user entered data (54, 56, 58) is scattered at discontiguous locations, individual TTS conversion of only those locations to be proofread is difficult. Furthermore, selection and conversion of individual discontiguous locations is cumbersome, with the user being unable to hear the complete set of desired locations without continual user interaction.

The preferred embodiment of the present invention provides the capability to select and store multiple user selected regions, after which these user selected regions may be continuously converted to speech. The selection, storage, and conversion of discontiguous regions begins with the user selecting a location in the open spreadsheet window 52 by highlighting the desired area. After this location in the open spreadsheet window 52 has been highlighted, the user activates the store function of the application through the LED store button 64, contained on the transport bar 36. This LED store button 64 selection causes the highlighted location to be extracted from the open spreadsheet window 52 of the spreadsheet target application 50. As with the basic operation, previously described, the first highlighted location is extracted by using the Windows copy function and the clipboard. However, when the LED store button 64 is activated, the application does not retrieve the selected data from the clipboard and immediately send the selected data to the TTS engine for conversion, but rather the selected location is stored in a local buffer of the application. The LED store button 64 increments the numerical value displayed, indicating that one buffer of selected information has been stored, and the process is repeated by the user for additional locations, until all the text which is to be read has all been selected and stored.

The application also indicates that one or more buffers containing text is waiting for conversion by altering the color of the stop button 66, which is contained on the transport bar 36. In the preferred embodiment, the color of the stop button 66 changes from yellow to red when there is multiple buffers stored by the user.

With the desired text extracted, user activation of the play button 46 sends the stored text buffers, continuously, and in the order selected, to the TTS engine for conversion. During this conversion to sound of each stored buffer, the LED store button 64 will display the numerical value which reflects the buffer which is currently being spoken.

During the TTS conversion of the stored text buffers, the user is provided with the capability of advancing through the stored text buffers, or repeating text buffers previously played. These two capabilities are provided through the transport bar 36 skip forward button 70 and skip backward button 72. User activation of the skip forward button 70 advances the current buffer being played or to be played, while the skip backward button 72 decreases the current buffer being played or to be played.

After the user no longer wishes to play the text stored in the local text buffers, the local text buffers may be erased.

This is accomplished by issuing a delete all buffers command. The delete all buffers command is issued by the user twice activating the stop button 66, with the application indicating the deletion of the stored text by changing the color of the stop button from red to yellow.

While the selected text is being played by the TTS engine, basic transport commands may be issued by the user. The transport bar 36 allows the conversion to be stopped by a single activation of the stop button 66, or the user may pause the conversion process through activation of the pause button 74. In addition, fast forward and reverse commands may be issued through the fast forward button 76 and rewind button 78, respectively.

Once the selected text has been presented to the text-to-speech engine, conversion is based upon user input which is provided through the control panel 38, preferences panel 40, and dictionary editor panel 42. The control panel 38 is activated when the control button 80, located on the transport bar 36, is selected by the user.

Figure 4:
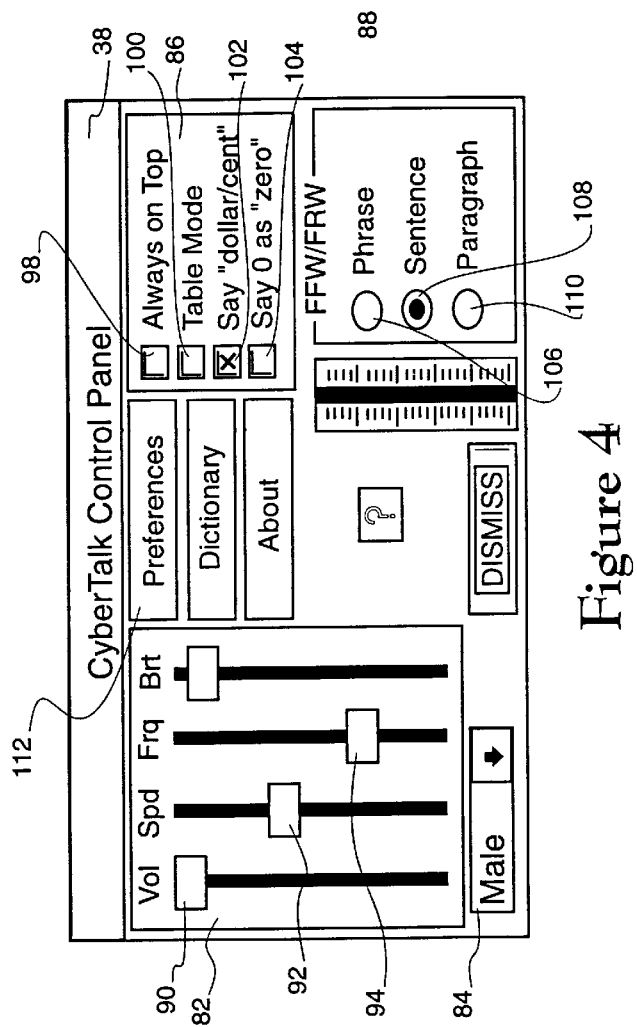
FIG. 4 is a detailed view of a first control panel of the preferred embodiment.

As can be seen in FIG. 4, the control panel 38 has four control groups: focal dimension control 82, gender selection 84, numerical/table conversion control 86, and fast forward and rewind jump sizing 88. The focal dimension control 82 provides user setting of the speech amplitude with the volume lever 90. The pace at which the text is spoken may be increased or decreased with the speed lever 92, and the fundamental voice frequency may be set to the user's preference with the frequency lever 94.

The numerical/table conversion control 86 provides a user interface for controlling aspects of the text-to-speech conversion when numerical text is present or the selected text is contained within a table having a rows and columns configuration. The always-on-top button 98 causes the transport bar to always be displayed on the top layer of the Windows display. In this way, the transport bar is always visible. The transport bar is displayed separately from and independently of any target applications. It is therefore desirable to have the bar "float" above any target applications running.

The table-mode button 100 invokes a special prosody algorithm that causes information read from tables to be spoken with more natural phraseology. Specifically, the special prosody algorithm causes the text-to-speech engine to pause slightly after each column, and apply end-of-sentence intonation after each row. The dollar-mode button 102 enables the text-to-speech converter to pronounce the word "dollars" and "cents" in the cases where a number is prefixed by the dollar sign, and the zero-mode button 104 allows the user to select whether the numerical value of "0" is to be spoken as a "zero" or "oh."

The fast forward and rewind jump sizes 88 allows the user to configure the jump size when the fast forward button 76 or rewind button 78 is activated. The distance advanced in the text can be set to one of the three sizes: phrase 106, sentence 108, or paragraph 110. Note that in the preferred embodiment of the present invention, when the phrase 106 is selected, and the text consists of numbers, the jump size is an individual number.

TTS conversion applications of the prior art limit jump sizes to that of words. In addition, prior art TTS applications do not provide a convenient way to alter the prosody, or stress and rhythm applied to syllables and words, which convey various types of information in spoken communication. With the current invention, because the rewind and fast forward functions are tightly integrated with the TTS conversion engine, jump sizes with granularities other than a word may be selected, and the prosody is not lost or distorted when a rewind or fast forward is requested.

In addition to the four control panel group preferences of the control panel 38, user control of sampling frequency, application start-up configuration, directory path configuration, and load voice are provided through the preferences panel 40. This additional control provided in the preferences panel 40, is accessed through the control panel 38 with the activation of the preferences button 112.

Figure 5:
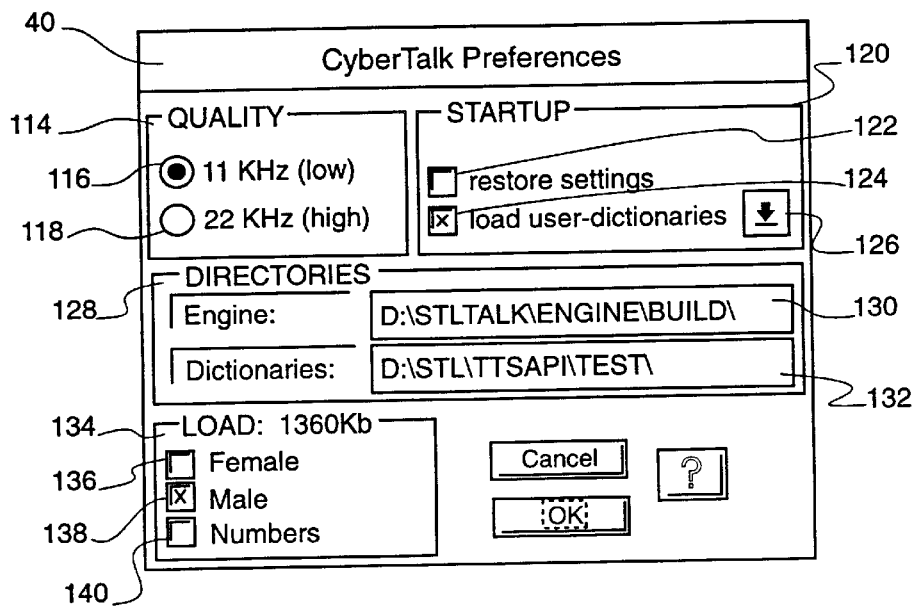
FIG. 5 is a detailed view of a Preferences control panel of the preferred embodiment.

Referring to FIG. 5, the preferences panel 40 is preferably subdivided into functional regions. In the speech quality region 114 the user can select between two radio buttons 116 and 118 to choose between a low sampling rate (11 KHz) and a high sampling rate (22 KHz). The text-to-speech engine concatenates digitally recorded samples to produce speech. Selecting the sampling rate in the preferences panel 40 tells the engine which set of sampled sounds are being used (the more compact, low sampling rate; or the high quality, high sampling rate).

The preferred embodiment allows the user to configure how the TTS engine will be configured at start-up. This is controlled in region 120 of the preferences panel 40. By checking box 122 the user can instruct the TTS application to restore user settings to the value existing at the end of the previous session. Alternatively, the user can check box 124 to load one of a plurality of user defined dictionaries. The list button 126 is clicked to display a pull-down menu listing all of the currently available user dictionaries. Essentially, any user can define his or her own dictionary that will designate how the TTS engine will sound when that user dictionary is invoked. The technique by which the user can accomplish this will be discussed more fully below in connection with the user dictionary panel shown in FIG. 6.

The preferred embodiment allows the TTS engine and user dictionaries to be stored at any user-selected location. In other words, the user can designate a directory/subdirectory or folder location in which to store the TTS engine and the user dictionaries. Region 128 of preferences panel 40 is where the user will enter the precise locations of these components so that the controller can locate these components and integrate them with the other components. Text box 130 is used to enter the full path location where the TTS engine may be found. Text box 132 provides a similar function, designating where the user dictionaries may be found. During experimental work it is convenient to be able to quickly switch between different TTS engines and different dictionary libraries. This may be conveniently done by storing the different engines and dictionary libraries at different path locations on the disk. Then, the desired engine or dictionary libraries can be rapidly selected by simply filling in the appropriate path information in text boxes 130 and 132.

Aside from being capable of switching between low sampling rate and high sampling rate sounds, the TTS engine can also select between different voices within both sampling rates. The preferred embodiment allows the TTS engine to use sampled sounds of a female voice and sampled sounds of a male voice. In addition, further sampled sounds are provided (in both voices) to enhance the pronunciation of numbers.

In region 134 of preferences panel 40 the user may designate which of these available sampled sounds should be loaded into memory where the TTS engine may access them. The sampled sounds are normally stored on the computer hard disk for archival storage purposes. To allow the samples to be concatenated and played in real time—to provide natural sounding speech—the samples should be loaded into faster random access memory or RAM. Because some computer systems may have a limited available of free RAM, the preferred embodiment allows the user to select only those voices that are needed. Thus by checking the boxes 136, 138, and 140, the user can load only those voices that are required, or unload voices no longer needed. The preferred embodiment displays the current amount of RAM used by virtue of the user's selections. In FIG. 5, the display indicates that 1360 Kb of RAM have been loaded. This corresponds to the check box 138 having been selected.

In a speech-to-text conversion, speech is classified at both the subword and word level. The classification is based on a phoneme which is the base defining unit in phonology. With the phoneme, an analysis may be made in which different sounds are produced when the phoneme is made in different contexts. Rules are therefore developed which produce the appropriate sound in a given situation. Words may also be analyzed in terms of their structure. Words may be broken down into units commonly referred to as morphemes and as with the phoneme, there are rules for forming words from morphemes. The user dictionary panel 42 allows an individual user to create individualized phoneme rules.

Figure 6:
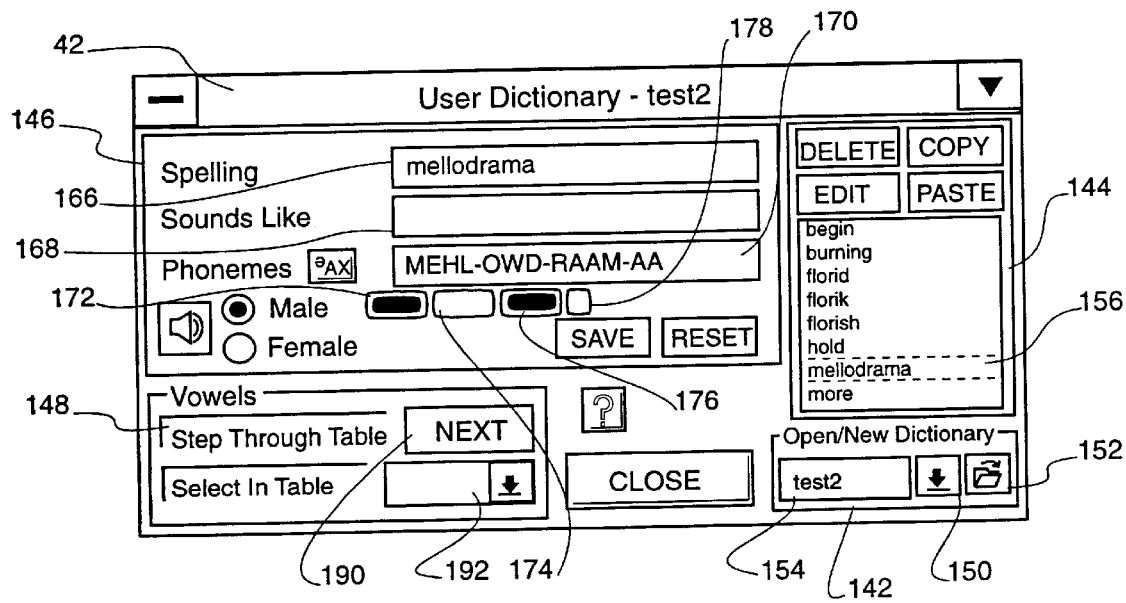
FIG. 6 is a detailed view of the User Dictionary editor control panel of the preferred embodiment of the invention.

FIG. 6 presents the dictionary editor panel 42 used to edit or generate an individualized dictionary. The dictionary editor panel 42 has four main groups to accomplish this function, a open/new dictionary window 142, word edit window 144, phoneme edit window 146, and vowel selection table 148.

The open/new dictionary window 142 allows a user to open and modify an existing dictionary, or to store the edits made during the current editing session in a new file The dictionary name window 154 displays the currently selected dictionary or allows a user to label that which has been newly created. A currently existing dictionary may also be selected from the dictionary pull down bar 150. The file button 152 opens the dictionary shown in the preferences panel 40, with only those directories residing in the current directionary path available.

The word edit window 144 presents a list of words which have been, or can be, phonetically altered. In the event that the user desires to edit the phonetic representation of a word found in the word edit window 144, the phoneme edit window 146 may be used to vary the sound. Because the word "melodrama" 156 has been selected from the dictionary, "melodrama" 156 has been placed within the spelling box 166. In the event that the user would like the currently selected word to be pronounced in the same fashion as another word of the user's choosing, the sounds like box 168 may be utilized to perform this function. Once a word has been chosen, a phonemic representation of the selected word is presented in the phonemes box 170. The box contains a phonetic representation in Klatt code form, which allows the user to see the individual phoneme tokens which will be concatenated together to form the currently selected word. The preferred embodiment as shown uses the Klatt code representation, however the international phonetic alphabet (IPA) is also available to the user in addition to a phonetic representation as provided by Random House.

The phoneme editor window 146 also provides for user selectable stress levels to be placed on each one of the syllables when produced. This user selectable stress level is provided with the stress buttons (172, 174, 176, 178) which are placed immediately beneath each of the presented syllables. The stress buttons (172, 174, 176, 178) provide three levels of stress, indicated to the user through color changes of the stress buttons (172, 174, 176, 178).

For those users who are unfamiliar with the phonetic representations as provided in the phonemes editor window 146, the vowel selection table 148 allows the user to select the proper vowel sound for a given syllable by highlighting the given syllable, and then cycling through the available vowel sounds which are audibly produced by the application so that the user may hear the sound produced by the selected token. Each time the user activates the vowel next button 190, the next vowel sound available will be played for the user. In addition, the vowel drop down menu 192 may be used to select the sound, represented by an example word, which the user would like to replace in the syllable or token selected in the phonemes box 170.

Figure 7:
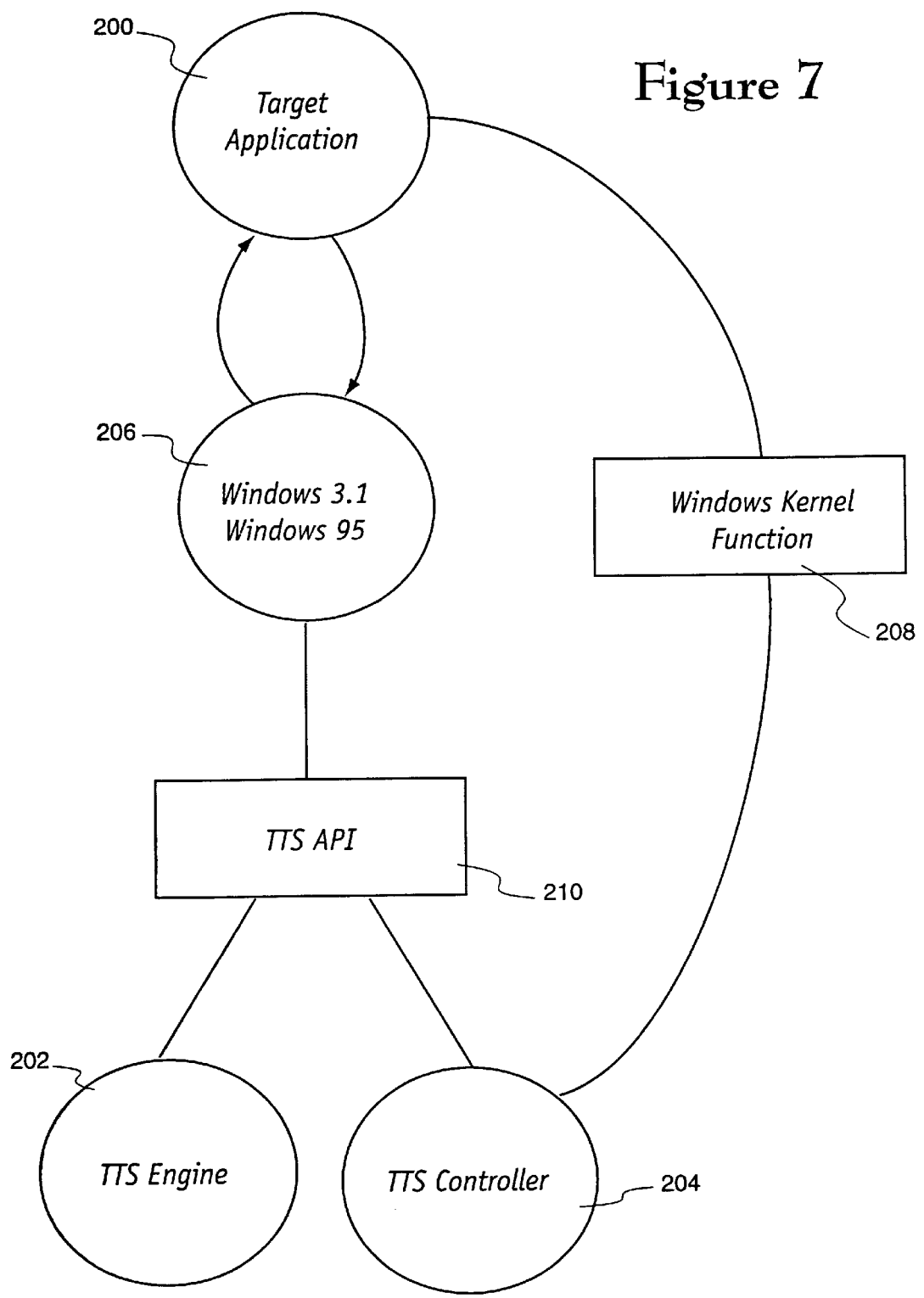
FIG. 7 is a software system block diagram presenting a high level overview of the text-to-speech synthesizer and the controller in accordance with the present invention.

FIG. 7 represents a high level overview of the text-to-speech synthesizer of the preferred embodiment of the present invention. As shown, the synthesizer involves three independent applications existing in a Windows environment. The target application 200 is running concurrently with the TTS engine application 202 and the TTS control application 204. The Windows operating system environment 206 is the means by which the target application 200, TTS engine 202, and TTS control application 204 interact. The TTS control application 204 utilizes a Windows kernel function 208 in order to simulate an input keyboard copy command in the target application 200, as previously described. The Windows kernel function is part of the Windows operating system environment 206. It has been shown separately here at 208 for illustration purposes.

The Windows operating system environment 206 supports both high level and low level speech objects that can be used to implement text-to-speech in Windows applications. These speech objects are OLE component objects that conform to the OLE component object model (COM). Microsoft Corporation has published a specification that defines the application programming interface (API) to which Windows compatible speech applications should conform. Although it is possible to implement speech objects without conforming to the Microsoft speech API, the preferred embodiment has been implemented to conform to this API, so that it will be compatible with other Microsoft Windows applications.

Essentially, the speech API is a set of interface rules. Applications desiring to implement text-to-speech functions in the Windows operating system environment should conform to those rules. Accordingly, in FIG. 7, the Windows text-to-speech application programming interface (TTS API) has been depicted at 210. As the illustration suggests, both the TTS engine 202 and the TTS controller 204 of the invention have been written to conform to the Microsoft speech API. For more information on the Microsoft speech API standard, refer to Microsoft Speech Software Development Kit Developer's Guide, published by Microsoft Corporation.

The controller of the present invention can be readily configured to work with any text-to-speech engine that complies with the Microsoft text-to-speech API. A suitable text-to-speech engine for this application is available from Centigram. However, to implement all of the features of the present invention, certain modifications to the basic text-to-speech engine may be made in accordance with the description provided herein.

Figure 8:
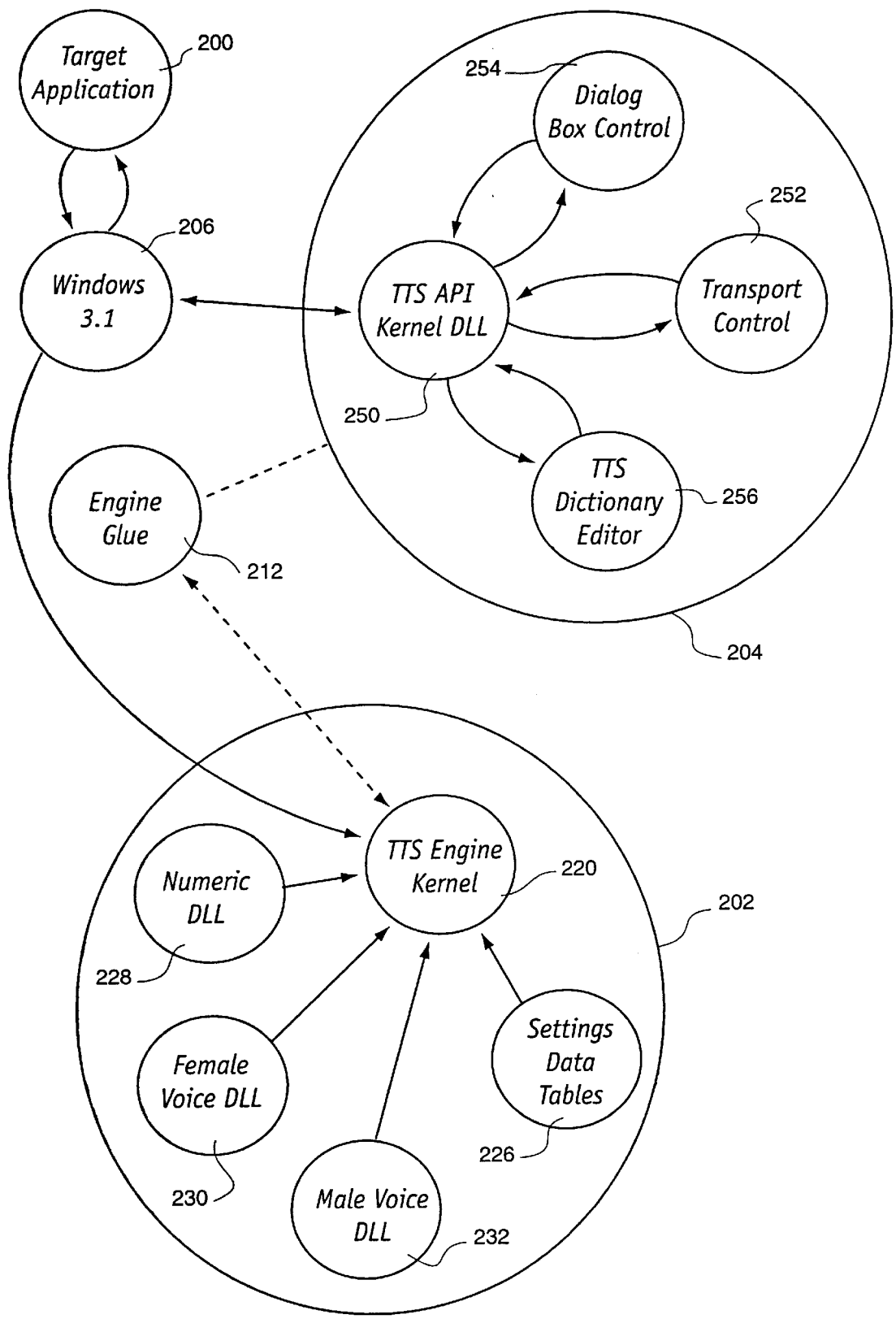
FIG. 8 is a more detailed software block diagram illustrating how the preferred embodiment is implemented in a Windows 3.1 environment.

FIG. 8 provides additional detail of both the text-to-speech controller 204 and the text-to-speech engine 202. The illustrated embodiment of FIG. 8 is for a Windows 3.1 operating system environment. The text-to-speech engine 202 comprises an engine kernel 220 that has access to a number of different dynamically linked libraries (DLL) containing speech data for different voices. In the preferred embodiment, a special collection of samples is included for numeric applications. These samples comprise the numeric DLL 228. Female and male voice DLLs 230 and 232 provide speech sample data to generate concatenated speech signals in either a female voice or a male voice, depending on the user's selection. User selections are stored as settings in a suitable data table 226. The controller 204 is able to send messages causing values in this data table to be changed. In this way the user can select which voice samples should be used during playback, as well as other text-to-speech engine settings, including selection of playback sample rate.

The controller 204 of the invention comprises a basic TTS API kernel DLL 250. The kernel DLL is designed to conform to the Microsoft text-to-speech API. Client processes, such as the transport control process 252, the dialog box control process 254 and the dictionary editor process 256 are launched from the kernel DLL 250. In the presently preferred implementation the dialog box control process 254 is launched when the user actuates the control button 80 on the transport bar 36. The dictionary editor may be launched in one of two ways. It may be launched from the control panel generated by the dialog box control process 254. It may also be launched independently as a separate stand-alone application from the standard Windows user interface.

Essentially, the controller 204 is configured to take advantage of the division of labor possible in a multi-tasking operating system environment. Thus, the kernel DLL 250 handles the primary communication function with the Windows operating system environment 206 and also with the text-to-speech engine 202. The kernel DLL 250 is responsible for conforming to the Microsoft text-to-speech API. Client processes 252, 254 and 256 use the services of the kernel DLL 250 to insure compliance with the text-to-speech API. Specifically, the transport control client process 252 displays the transport bar on the screen and coordinates and integrates the operation of the buttons on the transport bar. The transport control client process 252 is therefore responsible to insure that all buttons operate appropriately in the given context. For example, when the playback function is not currently operating, the stop button is displayed in a lighter shade or different color, indicating that the stop function is not currently available. Also, the transport control client process 252 will handle details of how the LED button is displayed, updating the digit counter as required.

The dialog box control client process 254 performs a similar function with respect to the control panel 38. Likewise, the dictionary editor client process 256 generates and operates the user dictionary panel 42.

In a Windows 3.1 implementation, the text-to-speech API does not have a message loop. Hence, communication cannot be effected directly through the standard Windows message loop. To overcome this, a shared memory module is provided. The shared memory module is designated engine glue 212 in FIG. 8. Essentially, engine glue module 212 defines a region of shared memory that the engine 202 and controller 204 may use to communicate with one another. Communication is effected by reading and writing to the shared memory space.

Figure 9:
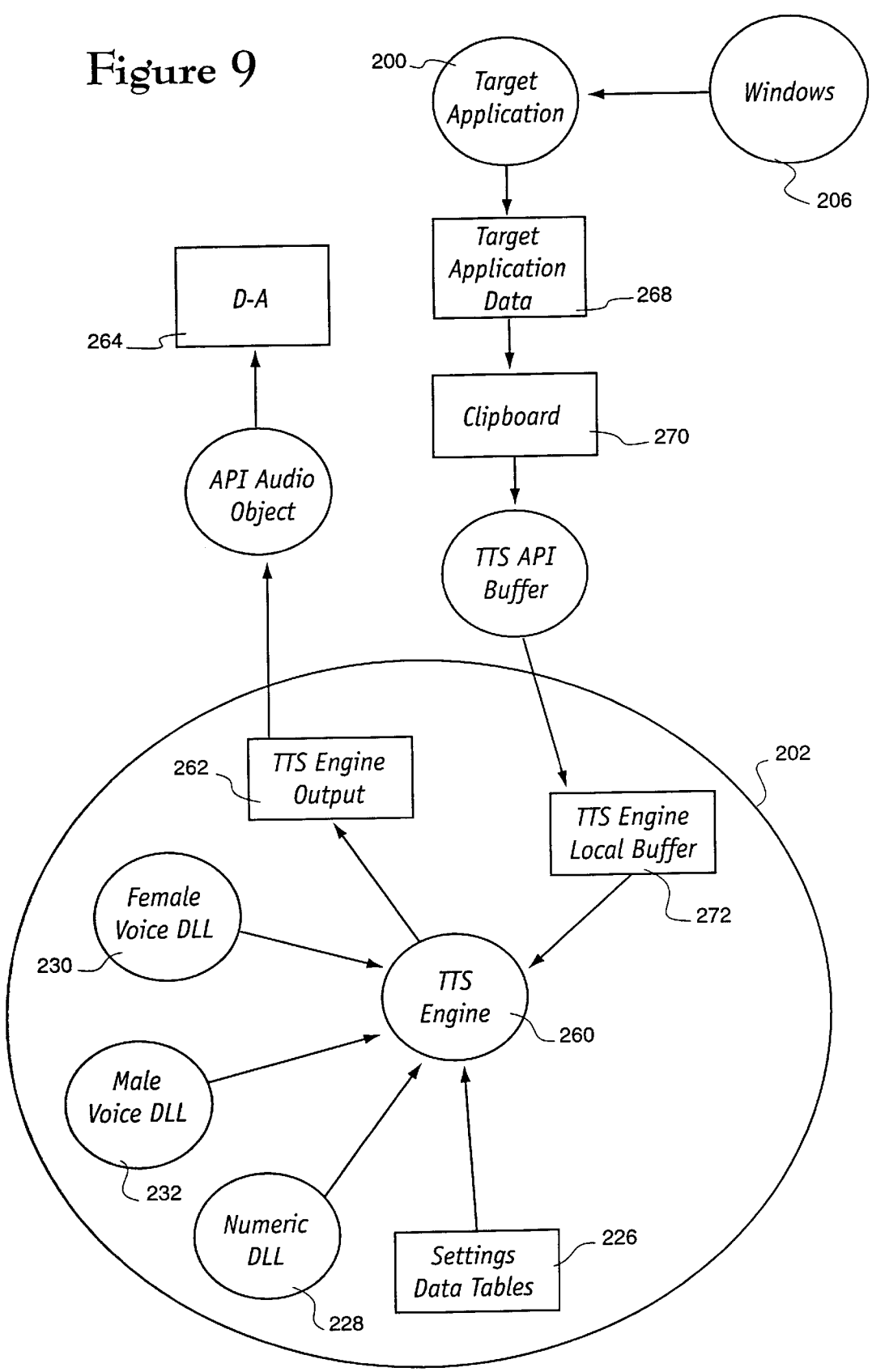
FIG. 9 is a detailed software block diagram illustrating the text-to-speech engine, showing how data from the target application are loaded into the local buffer of the text-to-speech engine.

FIG. 9 shows the text-to-speech engine in greater detail. As illustrated, the output of the text-to-speech engine 260 is supplied an an audio object as defined in the TTS API specification to the engine output driver 262 that in turn outputs the samples in concatenated sequence to the digital-to-analog conversion circuitry 264. This circuitry in turn would supply a suitable amplifier and speaker system, allowing the speech to be heard.

The text-to-speech engine operates on data that are copied from the target application to a local buffer in the text-to-speech engine. In FIG. 9, target application 200 has a set of application data 268. These data may be used by the target application 200 to display text or numbers on the computer screen. As previously described, the user will highlight these text or numbers and then activate the play button on the transport bar. The transport control client process 252 (FIG. 8) issues a series of commands through the Windows operating system environment to simulate the Windows copy and paste operations upon the highlighted data. This causes the data to be copied to the Windows clipboard 270. From the clipboard 270 the data are automatically then copied to the local buffer 272 of the text-to-speech engine. In the case where the LED store button has been used to select portions of text, activating the play button causes the portions of text stored in the LED buffers to be loaded into the local buffer 272 of the text-to-speech engine.

The engine operates upon the data stored in local buffer 272 as follows. When synthesis is initiated by activating the play button, the local buffer 272 will be loaded with a given quantity of text. This includes all carriage returns, spaces, tabs, and so forth. The size of the data actually transferred to the local buffer 272 will depend upon what has been selected by the user. In general, the more data stored the better, as this will provide a more full context to help in the synthesis process. Thus, an entire paragraph is better than a single sentence. An entire table is better than separate entries in the table. If sufficient memory is available, an entire text, such as a book, could be loaded into the local buffer. Typically this would not be necessary as the context of the text can be discerned from less than the entire book.

Figure 10:
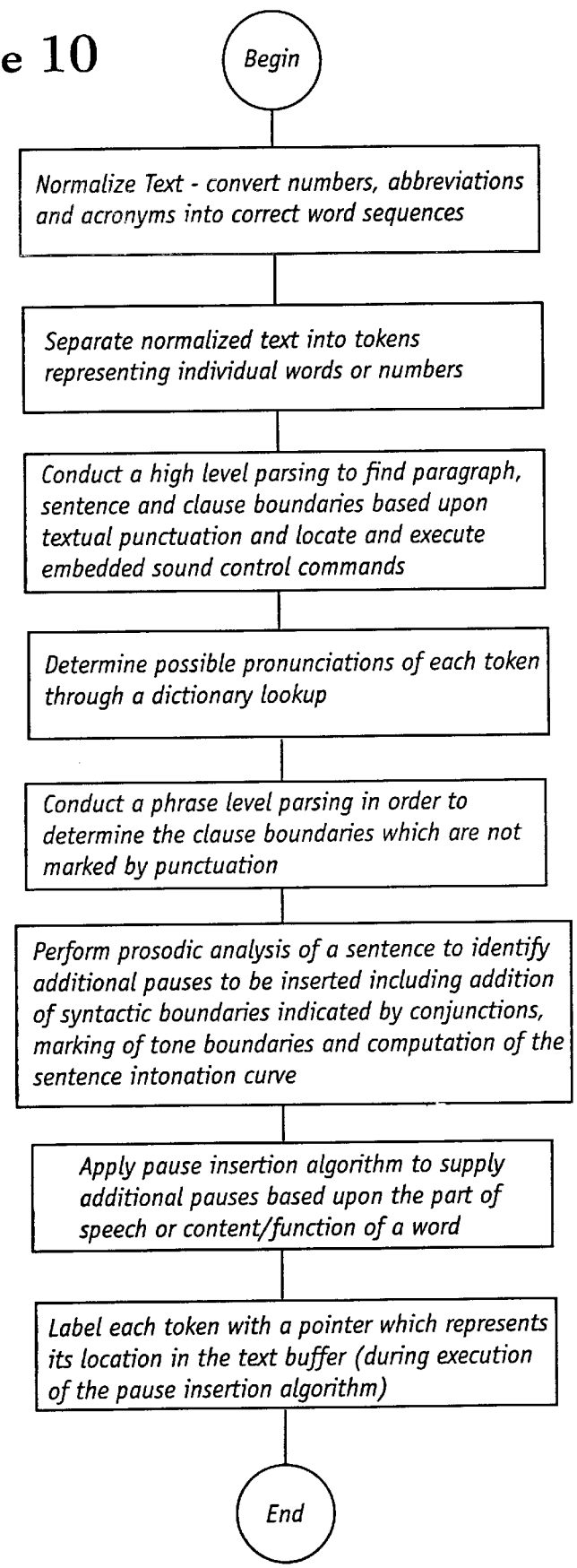
FIG. 10 is a high level flowchart illustrating the formatting or scanning process of the present invention in greater detail.

After loading the local buffer, the text is analyzed through a process called formatting or scanning. A high level flow-chart representing the formatting or scanning process is presented in FIG. 10. The process normalizes the text to convert numbers, abbreviations and acronyms into the correct word sequences. The formatting or scanning process then separates the text into tokens representing individual words or numbers. These are identified by detecting the white space between words. Next, a high level parsing is conducted to find paragraph boundaries, sentence boundaries and clause boundaries, based on embedded punctuation. As part of this text analysis any embedded commands are detected and executed. Typically, a speech synthesizer can be provided with embedded commands to accomplish control functions such as changing the speech rate and voice qualities. For example, an embedded command might signal that the next word should be stressed or that the next block of text should be treated as a table. Embedded commands are not required, however. The synthesizer will work well even without them.

High level parsing of the text into tokens accommodates a number of commonly encountered situations. For example, "805-687-0110" can be recognized as probably a phone number and it is spoken differently than "8:30" that is probably a time of day. Likewise, the parentheses in "(i.e. New York)" will cause pauses and changes in intonation, whereas the parentheses in "(" has to be read "left parenthesis"; and the single quote in "can't" or "O'Malley" is not taken as part of a pair.

High level parsing involves identifying words that are then looked up in a dictionary. The dictionary supplies a set of possible pronunciations corresponding to possible parts of speech. This information is stored in a dictionary associated with the text-to-speech engine. Later, when performing phrase level parsing, some of the parts of speech may be found to be impossible in the current context. That allows a narrowing down to one best part of speech for each word, and a corresponding best pronunciation. Each word thus begins to collect a packet of information that is associated with it. This packet of information is stored in a suitable data structure as will be more fully described.

In addition to storing pronunciation and part of speech information, each word identified by the parser will also include a pointer or index back into the local buffer 214. This allows the engine to "remember" where the word was located in the downloaded text. In essence, these information packets become leaves of a syntactic tree. The words do not correspond exactly to the text buffer's white space delimited words, because the tokens may convert into many spoken words. For example, the token "687-0110" would convert into "six-eight seven . . . zero-one-one-zero."

The nodes of the syntactic tree corresponding to paragraphs, sentences and clauses are already in place because they are delimited by embedded punctuation. However, there are some additional clause boundaries that may not be marked by punctuation. Certain parts of speech (such as conjunctions) will denote clause boundaries. These clause boundaries must be added by the engine. Information about syntactic entities, such as pointers to the beginning and ending within the text buffer, the sentence type, and so forth, are stored within the nodes of the syntactic tree. The syntactic tree in this context may also be called a grammatical tree. It is structured between the clause level and the word level. The current embodiment uses a phrase level parser that starts at the clause beginning and looks forward; or starts at the clause end and looks backward. The parser works a word at a time looking for noun phrases or verb phrases.

There are often a number of possible ways to split a clause into phrases. Typically, the best approach is to favor larger phrases. A phrase comprises a pre-defined sequence of selected parts of speech. After parsing, each word's information packet is updated to include the chosen part of speech and the chosen pronunciation. These are represented in a phonetic code. In addition, all syntactic phrases are marked as to the phrase type and boundaries.

Syntactic (or grammatical) phrases may not be identical to the phrases used by the controller 204. Rather, controller 204 works upon "prosodic" phrases, whose boundaries are delimited by a pause or breath. "Prosody" refers to the delivery or feel of speech, as to its timing, pauses, and intonation. A pause or breath boundary is a good place to jump forward or backward during transport control, because these boundaries typically delineate where speech is broken and not continuously voiced. Conversely, between prosodic boundaries speech is normally unbroken and is often continuously voiced (glottal vibration). In unbroken regions it is difficult to stop or re-start without losing intelligibility.

The parser information and word information packets are only stored for one sentence at a time in the preferred embodiment. In the case of very large sentences, only a part of the sentence is computed and stored—although this condition is rare. This "pipelining" is necessary because the computation involved takes a considerable amount of time. In an interactive situation, having a large quantity of text stored in the buffer can result in unwanted delay, recognized as a start-up latency problem. The latency problem occurs because it takes a long time to parse and fill the tree data structure before the output can be sent to the digital-to-analog conversion hardware. The present implementation avoids this by restricting the buffer size to one that can be readily delivered without apparent interruption. The preferred implementation delivers the data to the computer's D-to-A converter, where it is stored in a first-in, first-out (FIFO) buffer. Once stored in the FIFO buffer, the data may be played using interrupts or direct memory access (DMA). Once loaded into the FIFO buffer, the computer can resume its task of computing the next sentence to be spoken.

After parsing one sentence, a prosodic analysis of the sentence is performed. Several things are done at this stage. First, additional syntactic boundaries are defined to represent clause boundaries indicated by conjunctions. For example, in the following sentence there are two clauses separated by the conjunction "but": "He went to the store but left his money at home." Second, the words are marked as function words or content words based on the part of speech. Words like "the" and "at" are function words, while words like "Bill" and "running" are content words. Content words are accented or emphasized.

Next, based on parts of speech, certain types of prosodic phrases (delimited by "tone boundaries") are marked. These are given an accented word if, so far, no other word has been accented according to content or functional distinction. Finally, in some cases, content words are "de-accented" based on the density of the accented words and a hierarchy of word importance. Finally, an intonation curve is computed for the sentence, depending on accented words, prosodic phrases and other considerations.

After the preceding steps are accomplished, a pause insertion algorithm is performed. Some of the pauses are already determined by the boundaries mentioned in the above description, like clause boundaries. Additional pauses may be inserted as follows. Additional pauses may be inserted based on the part of speech or based on the content or function of the word. Also, pauses may be inserted to simulate where a human speaker would breathe. While these pause boundaries are being determined, the engine will place pointers back to the text buffer that will, in effect, partition the sentence into pause groups. The pause insertion algorithm marks the point at which speech is to "turn on" if starting in the middle of a sentence. Later in the text-to-speech processing cycle, some sound producing algorithms do not execute unless this switch is turned on.

If the user activates the rewind button to jump backward to somewhere in the middle of the previous sentence, the engine cancels playing of audio, throws away the remaining audio data and then cancels the remaining computation for the current sentence. At the same time all current phrase level and word level information may be discarded. Then, using previously computed data that marked paragraph, sentence and prosodic phrase boundaries in the text buffer, the engine goes back and starts computation on the previous sentence. Nearly all of the computations will have to be re-done (due to limited available RAM storage). This does not significantly degrade performance because generally the command to skip backward in the text comes from a user's mouse click. Psychologically, the act of clicking a mouse allows about one-quarter of a second before something would be expected to happen. This is about the latency needed to re-start a sentence speaking. Also, because the re-start occurs at a prosodic phrase boundary within the sentence, not all of the computations otherwise needed for producing speech need to be executed. Rather, only the ones needed to correctly set up the context for the starting point within the sentence must be performed at this stage. For instance, the prosody is computed for the whole sentence and all the words of the sentence are looked up in the dictionary. However, the phonetic level coarticulation effects and formant trajectories are not computed for the initial unspoken segment, since these have no contextual effect on the first phrase to be spoken. When the speech engine reaches the predetermined word on which the phrase to be spoken begins, all subsequent words are marked as "on," signifying that these subsequent words are later to be spoken.

To implement the fast forward and rewind features made possible by the controller 204, a "scrub" mode may be included in the text-to-speech engine 202. The scrub mode is to be contrasted with the "skip" mode described above. In the skip mode, the skip size is preestablished, based on the word, phrase, sentence, paragraph or buffer end points. When the forward or rewind buttons are activated, the engine causes speech to stop and then restart one unit ahead or one unit behind. In contrast, the scrub mode simply changes playback speed while speaking only the content (or important) words. Functional words are snipped out. By increasing the speech rate by about a factor of four, the effect is similar to a fast forward or rewind operation on an analog tape recorder with the tape head remaining in contact with the tape.

To select between the skip mode and the scrub mode, the controller can be made sensitive to the length of time the mouse button is held down. A rapid click on the forward or reverse buttons will cause the skip mode to be effected. Holding the mouse button down for a predetermined longer time will cause the scrub mode to be effected.

With the foregoing in mind, the following will describe the details of how the engine of the preferred embodiment determines sentence boundaries, paragraph boundaries and pause or breath boundaries.

The sentence boundary may be determined from within the engine's local buffer 214, or it may be determined using information generated by the dictionary and parser. The preferred embodiment establishes a variable "sentence done" which is initialized to TRUE. When the sentence done state is TRUE, the next alphanumeric text encountered starts a new sentence and the sentence done variable is set to FALSE. Thus the decisional logic focuses primarily on deciding when a started sentence is considered to be finished.

There are some simple cases and some special cases. When a sentence is started and the end of the buffer is reached, then the sentence is treated as done. If a sentence is started and a blank line follows the current token, then this is also treated as the sentence being done. In this case, the blank line is treated as the last token in the sentence.

Turning now to the special cases, when multicolumn tables are encountered and when the system is in table mode, then the rows are treated as sentences (in order to get falling sentence final intonation at the end of the row). Here the system looks for the last entry in the row and considers it to be the end of the sentence. Another special case arises in news text or headings on the same line as other text. For example, consider the following excerpt: "WASHINGTON (UPI)—the Senate, sympathetic about the economic . . . ," or "THE USE OF ACRYLIC IN MODERN ART For centuries artists have been . . . "

In the above example the system cannot yet use a word with an initial capital letter as a certain indication of sentence beginning because most proper names begin with a capital letter. In the above example, where all upper case mode has been established, a following lower case word with initial capital is an indication of a new sentence beginning. To establish that the text is in an all upper case mode, several upper case words must occur, or some kind of boundary marker, like the "-" in the above example. These show that the upper case word or words are more than just an acronym within the sentence to follow. When this situation is discovered, the upper case portion is treated as a sentence by itself. This allows the system to give falling sentence final intonation to mark the boundary.

The remaining ways to finish a started sentence involve a punctuation marker, such as a period or question mark or exclamation mark. Generally, these punctuation mark the end of a sentence, but there are times when they do not. If by themselves, the punctuation marks are within a pair of double or single quotes, then the synthesizer treats this as if the name of the punctuation mark should be spoken. Also, if punctuation marks appear in a string of jibberish that includes numbers or unpronounceable letter sequences or other punctuation, then the token is jibberish or may be something like a part number or e-mail address or expressive token. The system checks for such jibberish or part numbers, so that occurrences of these do not cause an end of sentence to be declared.

The occurrence of a period within a string of text has a number of ambiguous cases. When a period is found at the end of a string of letters, the system looks up this string in a list of abbreviations. Some of the abbreviations require a certain context, like a number before or after, as in "10 in." If a match is found in the abbreviation list, then if any of the following conditions are true, the period will be ignored as a finishing sentence: (1) if the abbreviation generally requires a following word like in "Mr. Jones"; (2) if the abbreviation (and the period) are followed by another punctuation other than a quotation mark; (3) if the abbreviation (and period) are followed by space or new line and the next token is not capitalized.

When a period is found after a nonabbreviated word, and is followed by a space and then by a noncapitalized word, the system does not consider this to be a new sentence. The function of the period in this instance is unknown and it is therefore ignored by the system. When a period is found in a number string with no other characters but commas (in the appropriate places), the system uses the period as a decimal point. If the period is found after a single capitalized letter, and is followed by a space and then a capitalized word with no intervening punctuation or another capital letter with period, then the system treats this as a middle initial of a name and otherwise ignores the period. Finally, if the system has not ignored the period for one of the above reasons, and if a sentence has been started, then a period will be taken to mark the end of the sentence. In the case of multiple periods in a sequence, some are ignored as ellipses, but the sentence will still be declared as finished.

Paragraph boundaries are expected to line up with sentence boundaries, but extra criteria must be met. If the last sentence was finished, and a new line starts with a tab or some spaces followed by a capitalized word, then the paragraph boundary is marked. Alternatively, if the last sentence was finished, and there is a blank line before the next word, then a new paragraph is started.

Determining pauses or breath boundaries involves yet another series of decisions. First, all clause boundaries (which primarily derive from punctuation) are assigned a pause. Similarly, all sentence internal punctuation (or punctuation groups) are assigned a pause, except in the case of a list of single words, separated by commas.

Next, pauses are inserted between some pairs of words where there is no punctuation. In the algorithm of the preferred embodiment, the decision on where the place the pauses depends on the following factors: (1) the nearness of the previous pause; (2) the tightness to which the two words are bound, based on grammatical rules; and (3) rules of preference for pause based on grammatical structure and content or function word categories.

In the pseudocode listing appearing in the Appendix, a set of rules is given to cover cases (1) and (3) above. These rules also incorporate, but do not define, the "tightness" between words. This tightness is sometimes called the break index. The presently preferred embodiment does not currently use a deterministic rule to establish the break index. Rather, the current system applies a set of rules to handle conditions that commonly occur. These rules are applied unless they would conflict with other rules, in which case the rule with the higher priority is used, otherwise both rules are ignored. By way of example, in the sentence "John broke down and went to the store." The pair of words "to the" are tightly bound, almost spoken as if they were one word. The system identifies word pair such as these and will not put a pause between them. Short prepositions followed by an article are pairs that would be assigned a low break index, indicating a tight binding of the two words. Similarly, very common short words that often come in pairs are given low break indexes as well. The current system thus applies a set of rules to groups of words that are known to likely occur. Break indexes are assigned to these groups, so that a determination can be made as to whether to place a pause between them.

As noted above, the engine also must be capable of handling embedded control commands or control "tags." Control tags are commands that are embedded in the text in order to control the synthesizer. Control tags can help the synthesizer do a better job, that is, to be more intelligible and natural-sounding. Control tags give clues that would otherwise be difficult to figure out computationally. They can also change the voice in a useful way. For example, a control tag can change the voice (at any point) from male to female or back again by adjusting the speech rate or pitch. This might be used in converting a typewritten dialogue between two persons. Control tags can also specify that a certain word is to be emphasized, to specify that a certain word should be treated as a certain part of speech, or to specify a given length of pause between two words.

Many of the control tags change the state of the synthesizer. For instance, once the system is changed from male voice to female voice, the synthesizer will remain in the new state (female voice) until told to do otherwise. In an interactive situation, the state can also be changed by other means, such as through a user-initiated mouse click in one of the control panels described previously. Proper handling of the current state must be considered in implementing the transport control (command bar). If, while proofreading, a certain sentence is supposed to be spoken with a female voice, but surrounding text is to be spoken by a male voice, then a jump from the female sentence to the male sentence, or from somewhere else into the female sentence must be handled properly. The present implementation handles this situation by scanning the entire local buffer again to determine exactly what the state should be for the target position of the jump. Alternatively, a state variable could be stored and retained for portions of text that have previously been scanned. The former approach is adopted in the preferred implementation because, as discussed above, rescanning the data in the local buffer can be performed very quickly, hence there is no undesirable delay perceived by the user.

To implement arbitrary repositioning, that is, a skip or jump to the appropriate phrase, sentence or paragraph boundary, the preferred embodiment allows the user to select any word within the desired phrase, sentence or paragraph and the system will skip or jump to the beginning of that phrase, sentence or paragraph. If the user specifies an arbitrary position within the text buffer and also specifies a unit size (phrase, sentence, paragraph or the like), then the speech engine will jump from the phrase, sentence or paragraph containing the arbitrary position to the beginning of another phrase, sentence or paragraph based on the specified unit size for the jump. Because the speech engine is designed to scan a larger block of text than may actually be spoken, the system is able to rewind to a point before the designated starting point selected by the user. Thus, if the user is in the middle of a paragraph and has selected the text-to-speech conversion to start in the middle of the paragraph, the user can press the rewind button and move to a point prior to the initial insertion point.

Because the system retains pointers to the original text buffer, the speech engine can communicate the current beginning boundary back to the target application. This would allow, for example, the first word of the current boundary to be displayed in highlighted text in the target application.

If desired, the system can be implemented so that when the pause button is activated while speaking is proceeding within the middle of a phrase or in the middle of a number, then the resumption of speech begins at the stopped sample.

The presently preferred engine employs a hold buffer technique whereby the data stored in the syntactic tree are retained after the audio has fully played out through the system. Thus, rather than flushing the buffer at the end of the output, the information is retained unless new information is loaded. This allows the user to rewind back into the text even after it has completely played. Without this feature, a user who got distracted at the end of the reading would have to reload the buffer and then fast forward to the end, to hear the end again. Holding the information after termination of synthesis avoids this inconvenience.

From the foregoing it will be appreciated that although the present invention has been illustrated and described with reference to a word text application and spreadsheet application, it will be apparent that the techniques employed in the illustrated embodiment can be applied to other applications. Accordingly, it will be understood that the invention is capable of certain modification or change without departing from the spirit of the invention as set forth in the appended claims.

APPENDIX

Now I can enumerate the rules which insert pauses in an unpunctuated word boundary. All of these rules will fail if the previously determined break index is considered too low.

1. /*
   * If at the end of a noun phrase,
   * and there are at least 5 syllables in this phrase,
   * and the larger clause that this phrase
   * is part of has more than 18 syllables,
   * and the number of syllables from the end of the
   * phrase to the end of the larger clause is at least 5, then
   * insert a pause at this point.
   * In other words, certain significant noun phrases are
   * treated as a clause.
2. /*
   * This is another rule which inserts a pause under certain conditions:
   *
   * (1) the next word is a function word, -continued

APPENDIX

Now I can enumerate the rules which insert pauses in an unpunctuated word boundary. All of these rules will fail if the previously determined break index is considered too low.

```
*     (2)  the current word is a content word,
*     (3)  the number of syllables in the current clause
*          up to and including the current word is >
*     (4)  the total number of syllables in the current
*          clause is > 17,
*     (5)  the number of syllables in the current clause
*          beyond the current word is >
*     (6)  there are at least 5 more words in
*          the clause,
*
3. /*
*     This is another rule which inserts a pause under certain
*     conditions:
*
*     (1)  the next word is a content word,
*     (2)  the current word is a content word,
*     (3)  the number of syllables in the current clause
*          up to and including the current word is > 20,
*     (4)  the number of syllables in the current clause
*          beyond the current word is >7,
*     (5)  there are at least 7 more words in the clause,
*     (6)  the word following the upcoming word is not a
*          function word.
```

What is claimed is:

1. A text-to-speech synthesizer for translating a plurality of discontiguous user-selected portions of text in an independent target application into an audio output that sounds like human speech, comprising:

a transport control bar;

a region store button contained on said transport control bar which when activated initiates a copy of a user-selected portion of text into one of a plurality of numerically indexed storage buffers such that said each of said plurality of numerically indexed storage buffers contains one of said plurality of discontiguous user-selected portions of text; and a text-to-speech engine which when activated sequentially translates the discontiguous user-selected portions of text stored in said indexed storage buffers into an audio output that sounds like human speech.

2. The synthesizer of claim 1 wherein said transport control bar is configured to run under a multi-tasking operating system that provides a clipboard facility for sharing information among multiple tasks and wherein said reserved segment of memory is administered by said clipboard facility.

3. The synthesizer of claim 1 wherein said text-to-speech engine includes a parser for constructing a syntactic tree of said text contained in said text storage buffer and for performing prosodic analysis upon said tree to mark prosodic phrases.

4. The synthesizer of claim 1 wherein said text-to-speech engine includes a parser for constructing a syntactic tree of said text contained in said text storage buffer and for performing prosodic analysis upon said tree to mark prosodic phrases and further includes a pause insertion mechanism for inserting pauses in said text contained in said text storage buffer based on said marked prosodic phrases.

5. The synthesizer of claim 1 wherein said text-to-speech engine includes a parser for constructing a syntactic tree of said text contained in said text storage buffer and for performing prosodic analysis upon said tree to mark prosodic phrases and further includes an intonation selection mechanism for inserting applying an intonation curve to said text contained in said text storage buffer based on said marked prosodic phrases.

6. The synthesizer of claim 1 wherein said text-to-speech engine includes a parser for constructing a syntactic tree of said text contained in said text storage buffer and for performing prosodic analysis upon said tree to mark prosodic phrases; and wherein said synthesizer further comprises at least one fast wind button contained on said transport control bar for suspending generation of said audio output, jumping from a current location to a different location in said text contained in said text storage buffer and then resuming generation of said audio output using said marked prosodic phrases to affect the translation of said text contained in said text storage buffer into said audio output.

7. The synthesizer of claim 1 wherein said synthesizer generates audio output at a first speed in response to activation of said play button; and wherein said text-to-speech engine further includes scrub mode fast wind mechanism for moving from a current location to a different location in said text contained in said text storage buffer while generating said audio output at a speed higher than said first speed.

8. The synthesizer of claim 1 wherein said text-to-speech engine further includes scrub mode fast wind mechanism for moving from a current location to a different location in said text contained in said text storage buffer by selectively omitting words while generating said audio output.

9. The synthesizer of claim 1 wherein said user-selected portion of text is a table and wherein said synthesizer further comprising a control panel communicating with said text-to-speech engine for selectively invoking a table prosidy mode that causes said text-to-speech engine to insert pauses at predetermined locations in said table.

10. The synthesizer of claim 1 further comprising a control panel communicating with said text-to-speech engine having a speed controller for altering the speech rate produced in said audio output.

11. The synthesizer of claim 1 further comprising a control panel communicating with said text-to-speech engine having a numerical pronunciation controller for altering the way text representing numerical values are represented in said audio output.

12. The synthesizer of claim 1 wherein said text-to-speech engine includes a dictionary of words and associated phonemic data used in producing speech and wherein said synthesizer further comprising a control panel communicating with said dictionary for allowing a user to alter the phonemic data associated with selected words in said dictionary.

13. The synthesizer of claim 1 wherein said text-to-speech engine includes a dictionary of words and associated phonemic data used in producing speech and wherein said synthesizer further comprising a control panel communicating with said dictionary for allowing a user to alter the stress applied to syllables of selected words in said dictionary.

14. The synthesizer of claim 1 wherein said text-to-speech engine includes a dictionary of words and associated phonemic data used in producing speech and wherein said synthesizer further comprising a control panel communicating with said dictionary for displaying stress selection buttons adjacent individual syllables of a selected word in said dictionary, said buttons being actuable to select among different syllable stress levels to be used by said text-to-speech in generating said audio output.

* * * * *